US007683945B2

(12) United States Patent
Leddy et al.

(10) Patent No.: US 7,683,945 B2
(45) Date of Patent: Mar. 23, 2010

(54) RESPONSIVITY CORRECTION FOR ELECTRO-OPTICAL IMAGERS

(75) Inventors: Christopher Leddy, Huntington Beach, CA (US); Robert J. Coda, Torrance, CA (US); Johnny Y. Lee, Aliso Viejo, CA (US); Stephen R. Nash, Playa del Ray, CA (US)

(73) Assignee: Raytheon Company, Waltham, MA (US)

( * ) Notice: Subject to any disclaimer, the term of this patent is extended or adjusted under 35 U.S.C. 154(b) by 1012 days.

(21) Appl. No.: 11/393,989

(22) Filed: Mar. 30, 2006

(65) Prior Publication Data

US 2007/0229681 A1 Oct. 4, 2007

(51) Int. Cl.
*H04N 5/217* (2006.01)
(52) U.S. Cl. .................. 348/241; 382/260; 382/312
(58) Field of Classification Search ............... 348/164, 348/241; 250/332; 257/231; 358/504; 382/312, 382/260
See application file for complete search history.

(56) References Cited

U.S. PATENT DOCUMENTS

| | | | | |
|---|---|---|---|---|
| 5,473,426 A * | 12/1995 | Hayano et al. | ........... | 356/237.2 |
| 5,604,347 A * | 2/1997 | Petrick et al. | ............ | 250/252.1 |
| 5,721,427 A * | 2/1998 | White et al. | ............ | 250/252.1 |
| 6,028,309 A * | 2/2000 | Parrish et al. | ............ | 250/332 |
| 6,687,414 B1 * | 2/2004 | Edgar | .................... | 382/275 |
| 6,901,173 B2 * | 5/2005 | Alderson et al. | ........... | 382/312 |
| 6,965,692 B1 * | 11/2005 | Ford | ........................ | 382/167 |

2004/0125227 A1  7/2004 Tsuruoka et al.

FOREIGN PATENT DOCUMENTS

| | | |
|---|---|---|
| EP | 0447187 B1 | 2/1996 |
| EP | 1447977 A1 | 8/2004 |

OTHER PUBLICATIONS

Narendra P M: "Scene-Based Nonuniformity Compensation for Imaging Sensors" IEEE Transactions on Pattern Analysis and Machine Intelligence, IEEE Service Center, Los Alamitos, CA, US, vol. 30, No. 1, Jan. 1, 1982, pp. 57-61, XP011242534 ISSN: 0162-8828.
Extended European Search Report issued on Jul. 20, 2009 in European Application No. 07251128.

* cited by examiner

*Primary Examiner*—Tuan Ho
*Assistant Examiner*—Kent Wang
(74) *Attorney, Agent, or Firm*—Pillsbury Winthrop Shaw Pittman LLP

(57) ABSTRACT

An imaging system and method with an arrangement for sensing the performance of an optical system and providing data in response thereto and electronically correcting nonuniformity in the performance of the optical system in response thereto. In the illustrative application, the nonuniformity is a porthole effect. In the preferred embodiment, the arrangement for correcting includes an arrangement for providing an inverse distortion to an output of the system electronically. The inverse distortion is applied by generating a plurality of spatial correction coefficients from the performance data, storing the coefficients and applying the coefficients to current data from the optical system. The spatial correction coefficients are statistically generated gain and level correction defect maps. The present teachings should enable a correction of optical distortion in nonideal electro-optical systems without requiring additional optics.

18 Claims, 5 Drawing Sheets

Original Image

Corrected Image

RESPONSIVITY CORRECTION FOR ELECTRO-OPTICAL IMAGERS

This invention was made with United States Government support under Contract No. N00019-97-C-0009 awarded by the Department of the Navy. The United States Government has certain rights in this invention.

BACKGROUND OF THE INVENTION

1. Field of the Invention

The present invention relates to imaging systems. More specifically, the present invention relates to systems and methods for nonuniformity correction for imaging systems.

2. Description of the Related Art

Imagers in various spectral bands are used in a variety of applications, both commercial and military. Unfortunately, certain imagers exhibit a significant signal rolloff toward the edges of the display. This rolloff is due to a responsivity distortion in which the gain falls off (attenuation increases) as a function of spatial location (distance from center) within one or more optical components. The rolloff has been labeled as the "porthole" effect and degrades image presentation as well performance. The resulting image presentation is degraded due to the distracting center circular region of the display that appears brighter than the edges. Performance is also degraded due to the fact that sensor signal processing wastes display dynamic range on the rolled off signal output from center to edge.

The porthole effect is due to optical distortion. Optical approaches to the correction of such optical distortion have been somewhat expensive to implement. In addition, the optical approaches do not allow for an inexpensive retrofit of existing systems in the field.

Hence, a need exists in the art for an electronic system or method for improving the performance of imagers. Specifically, a need exists in the art for an electronic system or method for improving the responsivity distortion of imagers.

SUMMARY OF THE INVENTION

The need in the art is addressed by the imaging system and method of the present invention. The inventive system includes an arrangement for sensing the performance of an optical system and providing data in response thereto and electronically correcting nonuniformity in the performance of the optical system in response thereto.

In the illustrative application, the nonuniformity is a porthole effect. In the preferred embodiment, the arrangement for correcting includes an arrangement for providing an inverse distortion to an output of the system electronically. The inverse distortion is applied by generating a plurality of spatial correction coefficients from the performance data, storing the coefficients and applying the coefficients to current data from the optical system. The spatial correction coefficients are statistically generated gain and level correction defect maps.

The present teachings should enable a correction of optical distortion in nonideal electro-optical systems without requiring additional optics.

BRIEF DESCRIPTION OF THE DRAWINGS

FIG. 2($b$) is a diagram showing the response variation of the original image of FIG. 2($a$).

FIG. 2($c$) is a graph of a defect map of correction terms generated in accordance with the present teachings to correct the response variation of FIG. 2($b$).

FIG. 2($d$) is a graph showing the response variation of the corrected image resulting from the application of the correction terms of FIG. 2($c$) to the original image of FIG. 2($a$).

FIG. 2($e$) is a corrected image resulting from the application of the corrected terms of FIG. 2($c$) to the image data of FIGS. 2($a$) and ($b$).

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
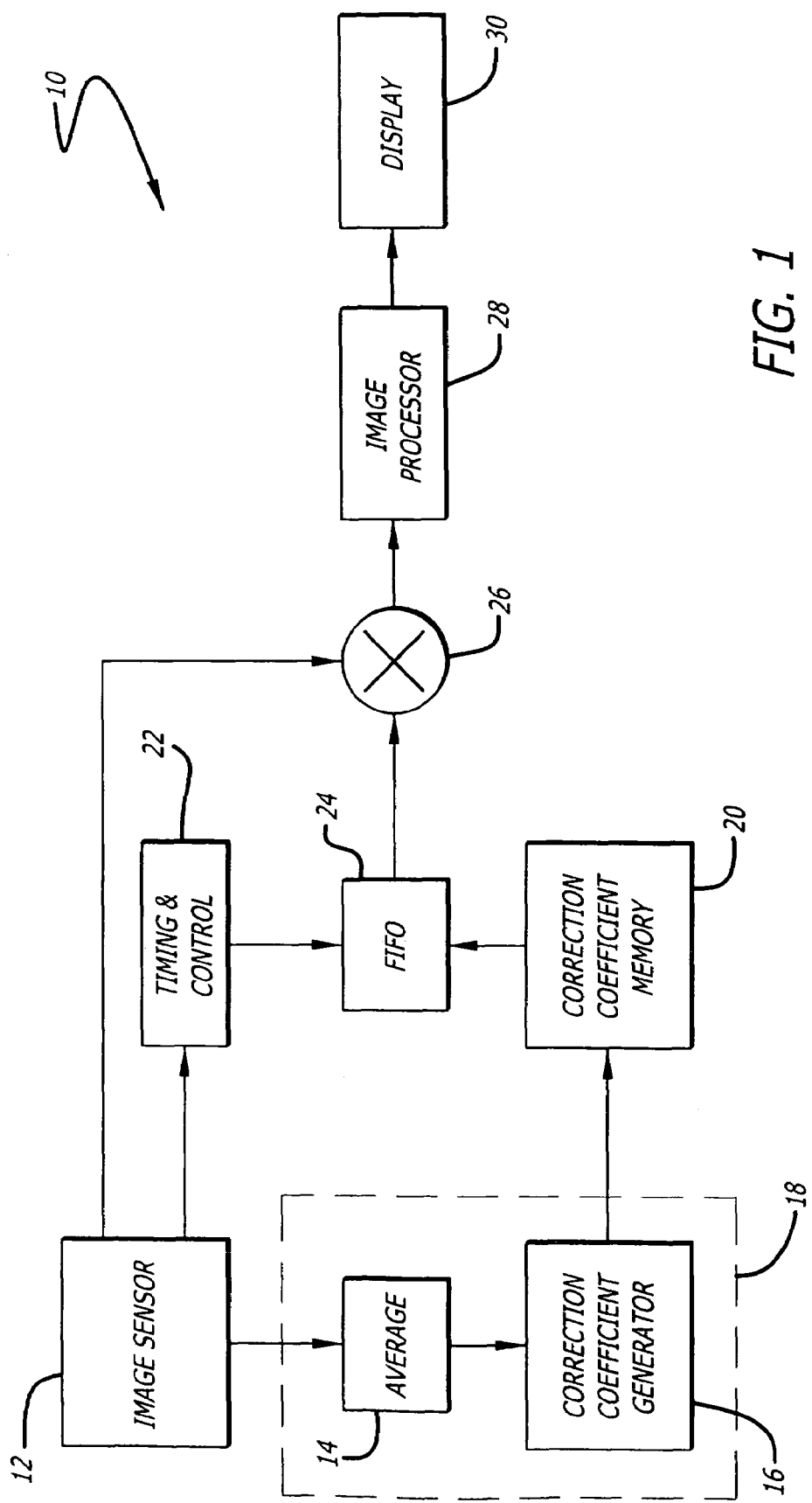
FIG. 1 is a block diagram of an imaging system in accordance with an illustrative embodiment of the present teachings.
Figure 2A:
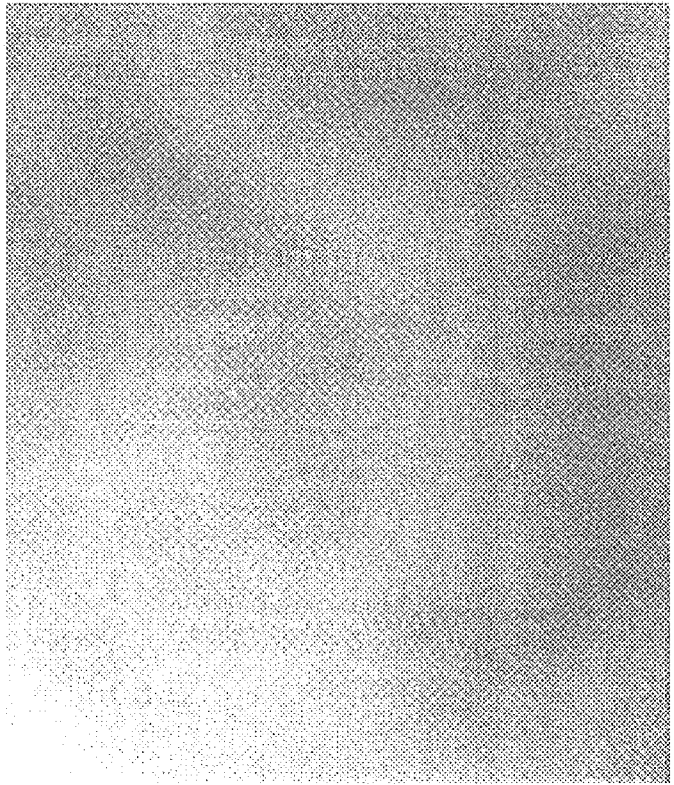
FIG. 2($i$ a) is a diagram of an illustrative image showing the porthole effect.
Figure 2E:
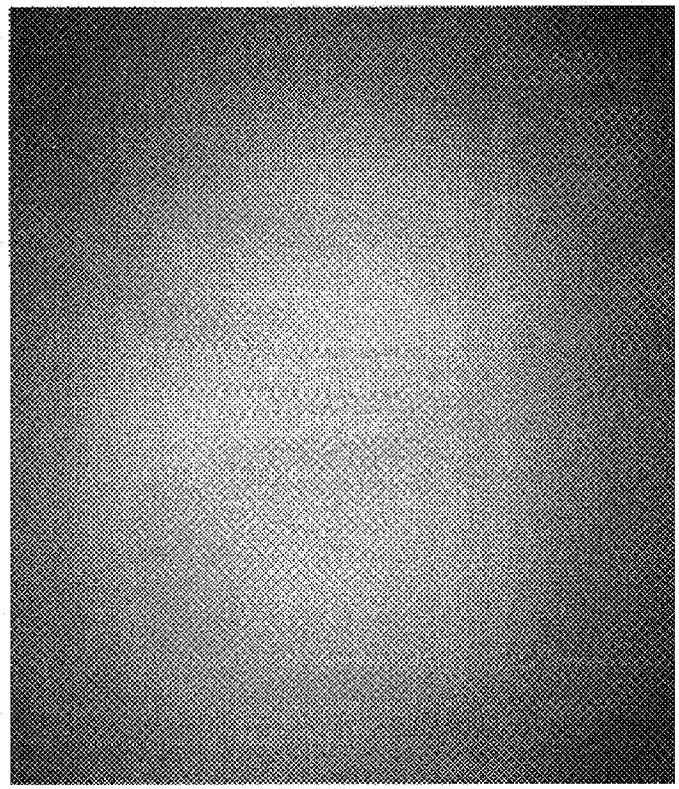
Figure 2B:
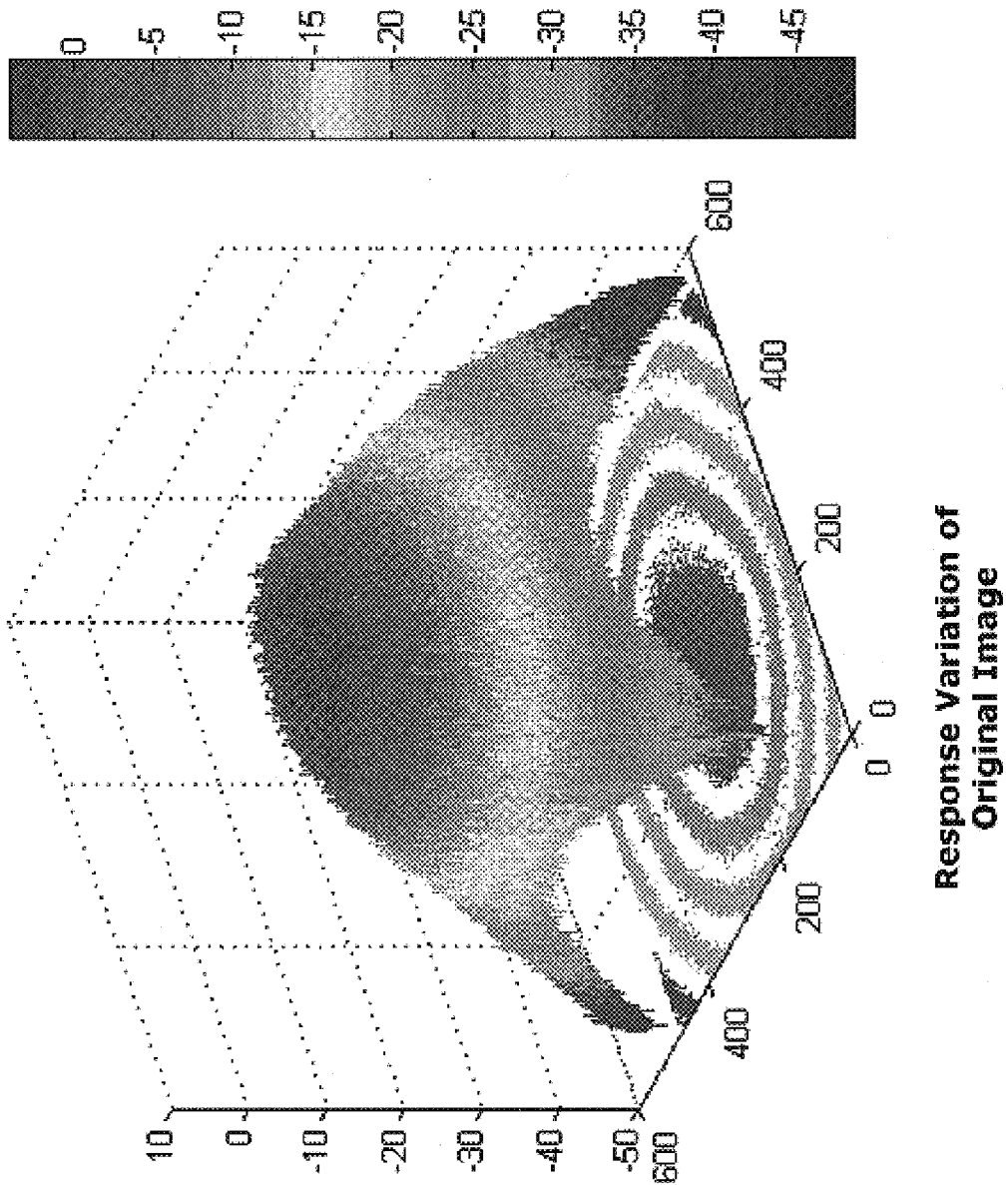
Figure 2C:
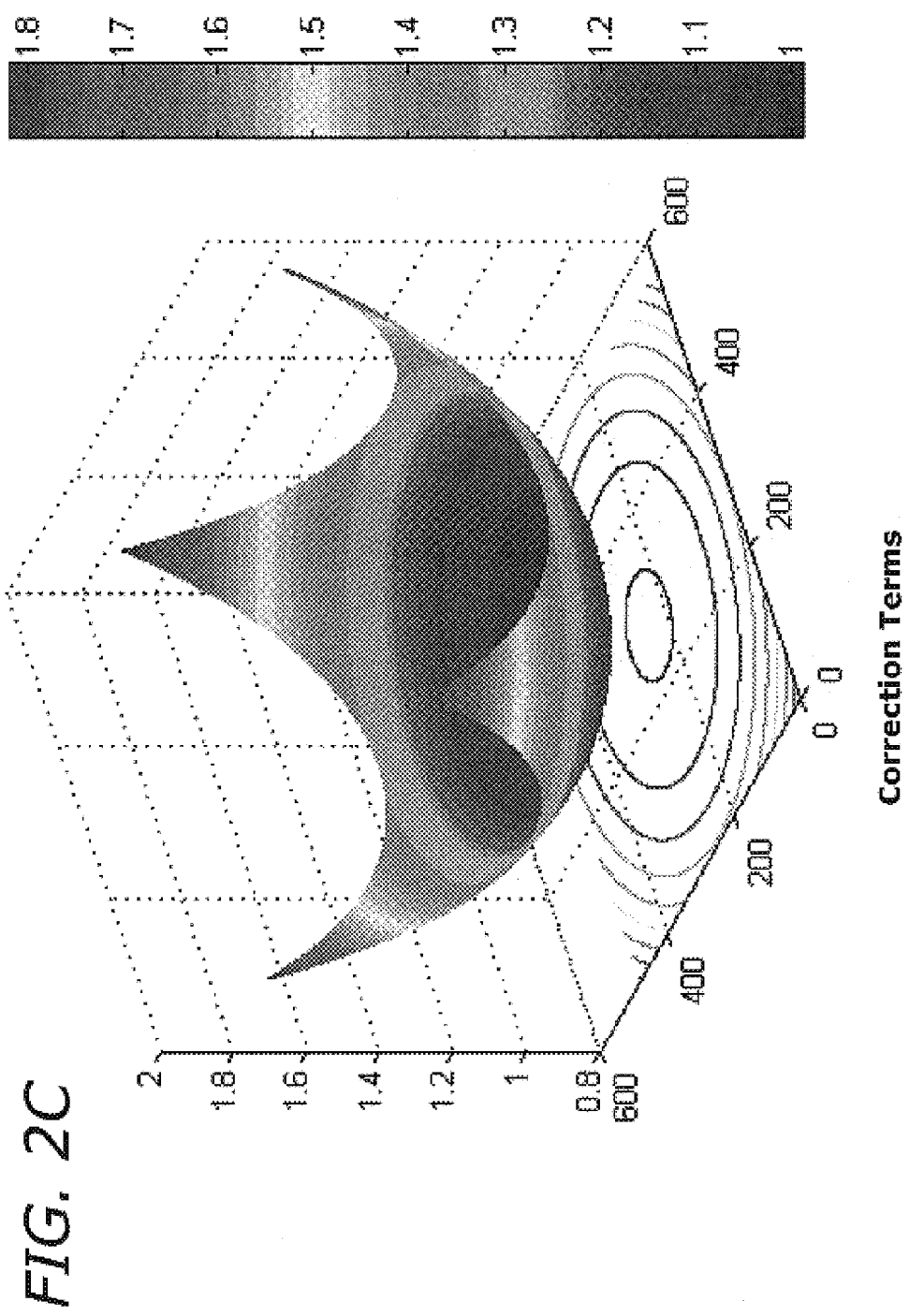
Figure 2D:
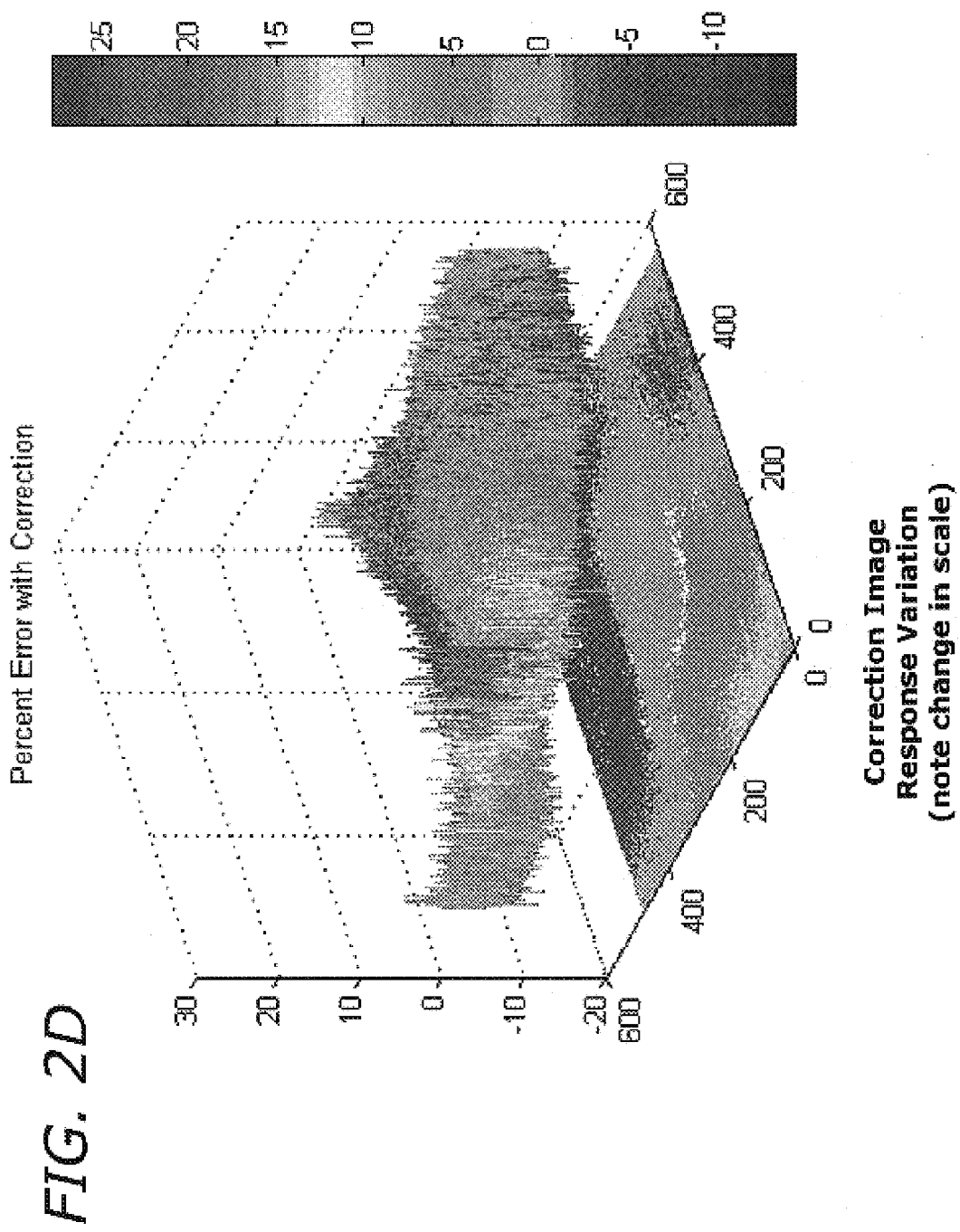

FIG. 1 is a block diagram of an imaging system in accordance with an illustrative embodiment of the present teachings. As shown in FIG. 1, the system 10 includes an image sensor 12. The image sensor 12 may be a camera, forward looking infrared (FLIR), or other image sensor with associated optical elements therefore. The image sensor 12 senses energy in the spectrum of interest and feeds sensed image data to an averaging filter 14. The averaged sensed data is fed from the averaging filter 14 to a correction coefficient generator 16. In the illustrative embodiment, the averaging filter and correction coefficient generator are implemented in software on a general-purpose computer 18.

In the preferred embodiment, the correction coefficients are generated manually using MATLAB software licensed by Mathworks. In the illustrative embodiment, the correction coefficients are generated by manually fitting spatially oriented gain responsivity or attenuation performance data from the sensor 12 to an optimum or desired performance curve. The resulting adjustments are the correction coefficients embodied in a statistically generated gain and level correction defect map required to adjust the output of the image sensor to correct for a spatially oriented nonuniformity such as the porthole effect mentioned above.

Those skilled in the art will appreciate that the present teachings may be used to correct for other nonuniformities or to optimize the performance of the sensor in another desired manner without departing from the scope of the present teachings.

The correction coefficients are stored in a memory 20 and selectively retrieved by a timing and control circuit 22 via a first in first out (FIFO) memory 24. The timing and control circuit may be implemented with a microprocessor. The timing and control circuit 22 serves to access the correction coefficient associated with the current data output by the image sensor on a pixel-by-pixel basis. This is illustrated in FIG. 2.

FIG. 2($a$) is a diagram of an illustrative image showing the porthole effect. FIG. 2($b$) is a diagram showing the response variation of the original image of FIG. 2($a$). FIG. 2($c$) is a graph of a statistically generated gain and level correction defect map in accordance with the present teachings to correct the response variation of FIG. 2(b). FIG. 2(d) is a graph showing the response variation of the corrected image resulting the application of the correction terms of FIG. 2(c) to the original image of FIG. 2(a). FIG. 2(e) is a corrected image resulting from the application of the corrected terms of FIG. 2(c) to the image data of FIGS. 2(a) and (b).

As shown in FIG. 1, the spatially oriented correction coefficients are applied through the FIFO 24 to current image data from the image sensor 12 via a multiplier 26. The corrected image data is forwarded to a display 30 via an optional image processor 28.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An imaging system, comprising:
   means for sensing the performance of an optical system and providing performance data in response thereto;
   an averaging filter that receives and averages the performance data; and
   a correction coefficient generator coupled to the averaging filter and configured to generate correction coefficients that are applied to image data from the optical system to correct nonuniformity in said performance of said optical system,
   wherein said correction coefficients are statistically generated to provide gain and level defect corrections.

2. The invention of claim 1 wherein said non-uniformity is a porthole effect.

3. The invention of claim 1 wherein said means for correcting includes means for providing an inverse distortion to an output of said system electronically.

4. The invention of claim 3 wherein said means for providing an inverse distortion includes means for generating a plurality of spatial correction coefficients.

5. The invention of claim 4 wherein said means for providing an inverse distortion includes means for storing said correction coefficients.

6. The invention of claim 5 wherein said means for providing an inverse distortion includes means for using said correction coefficients to correct said nonuniformity in said performance of said system.

7. The invention of claim 6, wherein said means for using said correction coefficients to correct said nonuniformity in said performance of said system includes a multiplier.

8. An imaging system, comprising:
   means for sensing the performance of an optical system and providing data in response thereto; and
   means responsive to said data for electronically correcting nonuniformity in said performance of said optical system,
   wherein said means for correcting includes means for providing an inverse distortion to an output of said system electronically,
   wherein said means for providing an inverse distortion includes means for generating a plurality of spatial correction coefficients,
   wherein said means for providing an inverse distortion includes means for storing said correction coefficients,
   wherein said means for providing an inverse distortion includes means for using said correction coefficients to correct said nonuniformity in said performance of said system,
   wherein said means for using said correction coefficients to correct said nonuniformity in said performance of said system includes a multiplier, and
   wherein said spatial correction coefficients provide statistically generated gain and level correction defect maps.

9. An imaging system, comprising:
   a sensor for sensing the performance of an optical system and providing performance data in response thereto; and
   a circuit responsive to said performance data for electronically correcting nonuniformity in said performance of said optical system,
   said nonuniformity being a porthole effect and said circuit including means for providing an inverse distortion to an output of said system, said means including:
   means for generating a plurality of spatial correction coefficients,
   means for storing said spatial correction coefficients, and
   means for applying said spatial correction coefficients to correct said nonuniformity in said performance of said system,
   wherein said spatial correction coefficients comprise statistically generated gain and level defect corrections.

10. The imaging system of claim 9, wherein said means for generating a plurality of spatial correction coefficients comprises an averaging filter coupled to a coefficient generator, said averaging filter being configured to receive said performance data.

11. An image method, comprising:
   sensing a performance of an optical system and providing performance data in response thereto;
   averaging the performance data by using an averaging filter;
   generating correction coefficients that are statistically generated using the averaged performance data to provide gain and level defect corrections; and
   electronically correcting non-uniformity in said performance of said optical system by applying the correction coefficients to image data from the optical system.

12. The invention of claim 11 wherein said non-uniformity is a porthole effect.

13. The invention of claim 11 wherein said step of correcting includes the step of providing an inverse distortion to an output of said system electronically.

14. The invention of claim 13 wherein said step of providing an inverse distortion includes the step of generating a plurality of spatial correction coefficients.

15. The invention of claim 14 wherein said step of providing an inverse distortion includes the step of storing said correction coefficients.

16. The invention of claim 15 wherein said step of providing an inverse distortion includes the step of using said correction coefficients to correct said nonuniformity in said performance of said system.

17. The invention of claim 16 wherein said step of using said correction coefficients to correct said nonuniformity in said performance of said system includes step of multiplying said data by said coefficients.

18. An imaging method, comprising:
sensing the performance of an optical system and providing data in response thereto; and
electronically correcting non-uniformity in said performance of said optical system in response to said data,
wherein said correcting includes providing an inverse distortion to an output of said system electronically,
wherein said providing an inverse distortion includes generating a plurality of spatial correction coefficients,
wherein said providing an inverse distortion includes storing said correction coefficients,
wherein said providing an inverse distortion includes using said correction coefficients to correct said nonuniformity in said performance of said system,
wherein said using said correction coefficients to correct said nonuniformity in said performance of said system includes multiplying said data by said coefficients, and
wherein said spatial correction coefficients provide statistically generated gain and level correction defect maps.

* * * * *